April 19, 1927.
J. H. HAMMOND, JR
1,625,252
CONTROL SYSTEM FOR AIRCRAFT
Original Filed Feb. 5. 1919  2 Sheets-Sheet 1
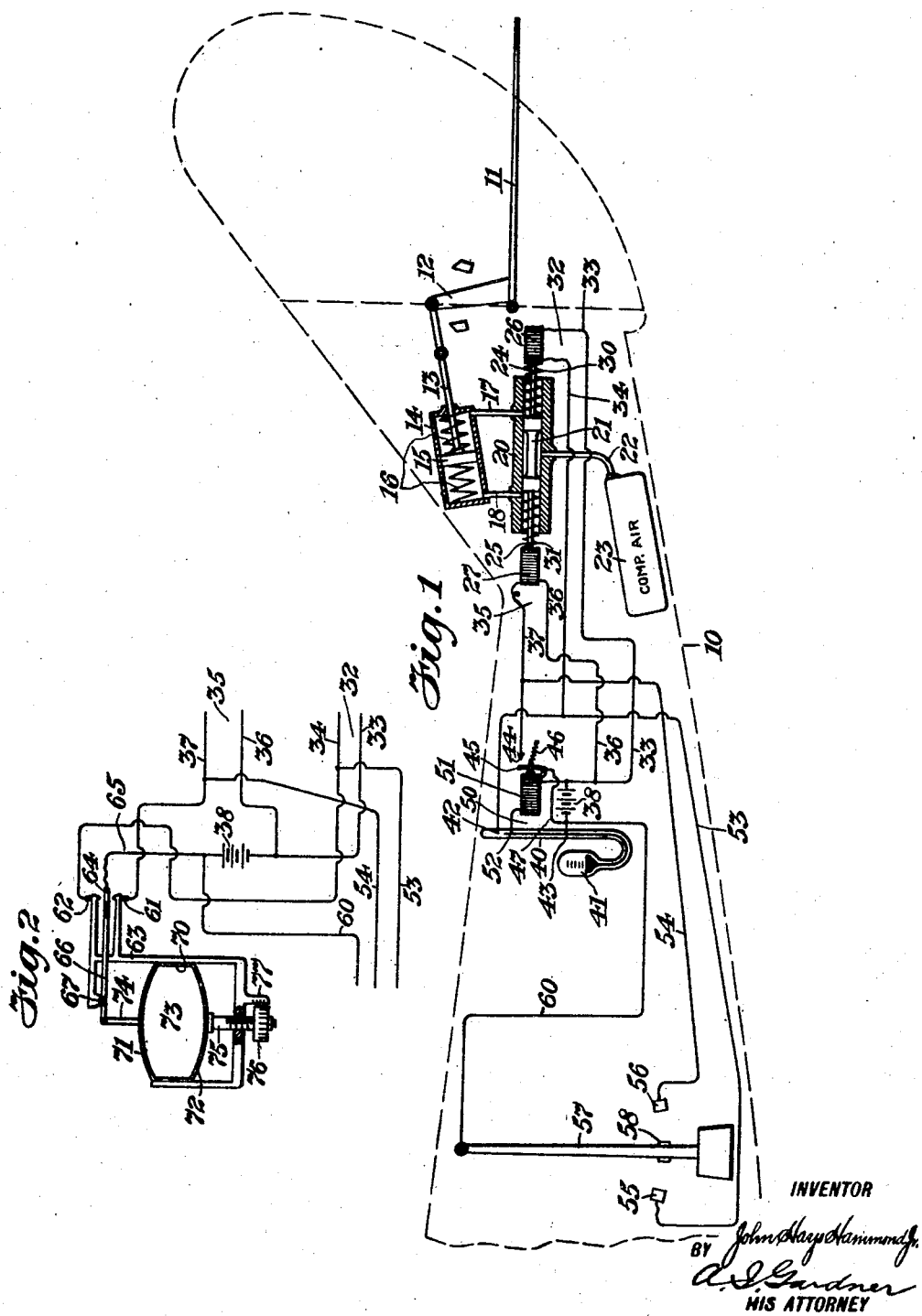
INVENTOR
John Hays Hammond Jr.
BY
A. J. Gardner
HIS ATTORNEY

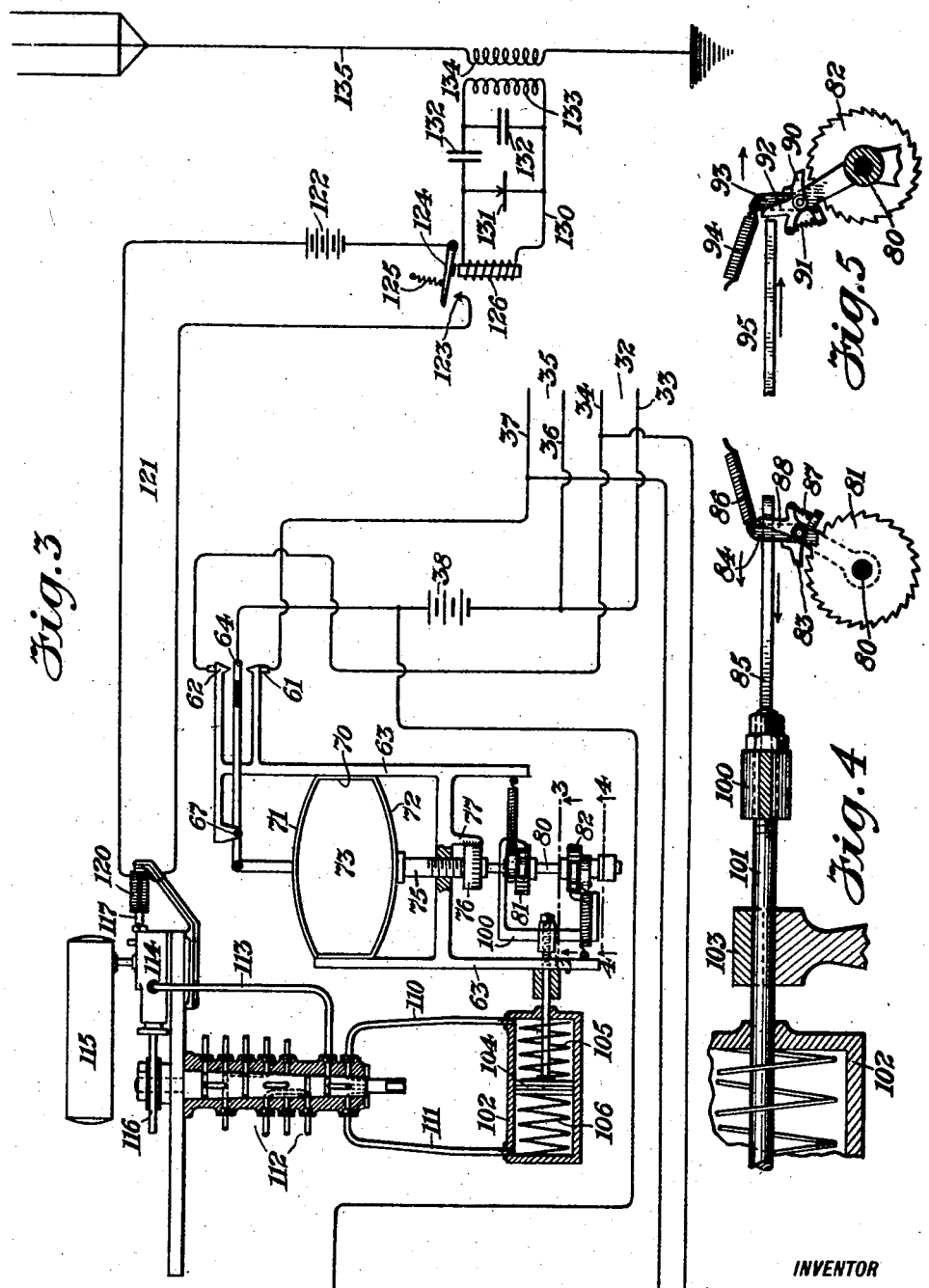

Patented Apr. 19, 1927.

1,625,252

UNITED STATES PATENT OFFICE.

JOHN HAYS HAMMOND, JR., OF GLOUCESTER, MASSACHUSETTS.

CONTROL SYSTEM FOR AIRCRAFT.

Application filed February 5, 1919. Serial No. 275,174.

Some of the objects of the present invention are to provide means for maintaining an aeroplane or other dirigible aircraft flying in a horizontal plane at a predetermined altitude; to provide means responsive to differences in atmospheric pressure for causing an aeroplane to return to a course fixed at a predetermined altitude in case the aeroplane should rise or fall below the given altitude; to provide gravity controlled means for causing an aeroplane to return to a course fixed at a predetermined altitude in case the aeroplane should dive or ascend suddenly; to provide means for controlling the course of an aeroplane with respect to its altitude, such control being operative at will from a distance; to provide means responsive to radiant energy for controlling the course of an aeroplane with respect to its altitude; and to provide other improvements as will hereinafter appear.

In the accompanying drawings Fig. 1, represents a fragmentary diagrammatic side elevation of an aeroplane provided with one form of horizontal rudder control embodying the present invention; Fig. 2, represents a modified form of rudder control; Fig. 3, represents diagrammatically one form of control for varying the course of the aircraft at will from a distance in response to signals of radiant energy; Fig. 4, represents a section on line 3—3 of Fig. 3; and Fig. 5, represents a section on line 4—4 of Fig. 3.

Referring to the drawings one form of the invention is shown in Fig. 1, wherein the body to be controlled is assumed for purposes of illustration to be an aeroplane 10, though it is to be understood that the invention is equally applicable to any form of controlled or dirigible aircraft.

For the purpose of controlling the movement of the aeroplane 10 about a transverse horizontal axis, whereby its altitude may be controlled in the desired manner, a rudder 11, is suitably pivoted to the rear portion of the aeroplane body 10 and is arranged to be operated by suitable lever mechanism 12, which has connection with a piston rod 13. This rod 13 passes within a cylinder 14 where it terminates in a piston 15 mounted for free reciprocation, though it is normally held in a neutral position by two opposed springs 16. In this neutral position of the piston 15 the rudder 11 is maintained in a horizontal position so that under normal conditions the altitude of the aeroplane 10 is constant.

For moving the piston 15 in either direction the ends of the cylinder 14 are respectively connected by pipes 17 and 18 with a control valve casing 20, which has therein a movable valve element 21 arranged to establish communication between one or the other of the pipes 17 and 18 and a pipe 22, which is in communication with a source of fluid pressure, such as a reservoir 23 of compressed air. Normally the valve element 21 is in a position to cut off the supply of fluid pressure from the pipe 22, while the pipes 17 and 18 are in communication with the atmosphere by way of the open ends of the casing 20 respectively.

In order to shift the valve element 21 in either direction it is provided with oppositely disposed stems 24 and 25 extending outside of the casing 20 and respectively forming cores of two solenoids 26 and 27 which are located in proper alignment with the valve element 21 for the purpose intended. The valve stems 24 and 25 are respectively encircled by coil springs 30 and 31 which react between the movable element 21 and the fixed solenoids 26 and 27 to normally maintain the valve element 21 in a neutral position, that is cutting off both the pipes 17 and 18 from the pressure fluid. The solenoid 26 is in a circuit 32 including conductors 33 and 34, while the solenoid 27 is in a circuit 35 including conductors 36 and 37. A battery 38 is arranged common to both circuits 32 and 35 for energizing either, though obviously separate batteries may be employed or any other suitable arrangement.

For automatically and selectively energizing the solenoids 26 and 27 to cause the rudder 11 to be moved in the direction necessary to overcome a variation of the aeroplane from its predetermined altitude, one form of control mechanism employed consists of a mercury or other suitable barometer 40 provided with a graduated receptacle 41 which is open to the atmosphere and so arranged as to permit the addition of a certain amount of mercury in order to maintain the head of the column at the same height in the tube for various pressures corresponding to certain altitudes. The rise and fall of the mercury column in the barometer tube 40 is utilized as a means for controlling the eleceric circuits 32 and 35 and to that end is provided with a contact 42 sealed in the tube 40 in the path of the mercury column and forming one terminal of the circuit 32. This contact 42 is located above the normal level of the mercury column so that the circuit 32 is open under such conditions. The other terminal of the circuit 32 is the mercury column itself which has a contact 43 immersed in it and sealed in the tube 40, this contact 43 being electrically connected to one pole of the battery 38. The circuit 35 is provided with means for closing and opening it which, as here shown, consists of a terminal 44 positioned adjacent and in the path of a pivoted armature 45, which is arranged to be brought into contact with the terminal 44 by a spring 46 or any other suitable means. This armature 45 is connected by a conductor 47 to the opposite pole of the battery 38 from that to which the conductor 36 is connected. Normally the circuit 35 is open and for this purpose a local circuit 50 is provided including the battery 38, a relay 51 and a contact 52 sealed in the tube 40 as one terminal, while the other terminal is the mercury column. This contact 52 is located in relatively close proximity to the normal mercury level but below the same so that under ordinary conditions at a given altitude the circuit 50 will be closed and the relay 51 energized to hold the armature 45 out of contact with the terminal 44.

For the purpose of compensating for sudden dips of either end of the body 10, the solenoid circuits 32 and 35 are respectively provided with branch conductors 53 and 54 connected respectively to terminal contact points 55 and 56, which are spaced apart and arranged on opposite sides of a suitable weighted pendulum 57, but in the path path of a terminal contact 58 carried by the pendulum 57. The contact 58 is electrically connected to a conductor 60 which leads to a pole of the battery 38 opposite to that to which the conductors 53 and 54 are connected. The arrangement is such that after the pendulum 57 has swung a predetermined number of degrees in either direction it will bring the contact 58 into contact with one or the other of the terminals 55 or 56 thus completing the circuit necessary to energize the proper solenoid, either 26 or 27, to cause the rudder 11 to be actuated to restore conditions to normal.

In describing the operation of the system it will be assumed that the aeroplane 10 is flying horizontally at a given altitude for which the barometer 40 has been initially set and under these conditions the mercury column will be in the position shown in Fig. 1, with the two circuits broken at the terminals 42 and 44 and also at the terminals 55 and 56. If the aeroplane should now sink to a lower level the increase in the atmospheric pressure would force the column of mercury to ascend and submerge the contact 42. This will close the circuit 32 and result in the energization of the solenoid 26, whereupon the valve element 21 will be drawn (to the right as seen in Fig. 1) to a position where communication is established between the pressure fluid supply pipe 22 and the pipe 17. The pressure fluid may thus enter the cylinder 14 and force the piston 15 in a direction to cause the rudder 11 to be elevated and bring the aeroplane back to the predetermined altitude. When this position has been reached the mercury column will have dropped below the contact 42, thus breaking the circuit 32 and allowing the valve 21 and the piston 15 to be restored to their neutral positions respectively by spring action, with the result that the rudder 11 again assumes the horizontal position.

If the aeroplane should ascend to a higher level the lower atmospheric pressure will cause the mercury to drop and when it breaks with the contact 52 the local circuit 50 is broken, the relay 51 de-energized and the armature 45 is released to engage the terminal 44. The circuit 35 is thus closed and the solenoid 27 energized to cause the valve element 21 to establish communication between the pipes 22 and 18, thereby moving the piston 15 in a direction to depress the rudder 11 and restore the aeroplane 10 to the predetermined altitude.

In case the aeroplane 10 should dip suddenly, for example a forward dive, then the pendulum 57 will swing forwardly and bring the contact 58 into contact with the terminal 55 to close the circuit 32, which as previously described will cause the rudder 11 to be elevated and return the aeroplane to the predetermined altitude. A rearward tipping of the aeroplane will swing the pendulum 57 to close the circuit 35 through the terminal 56 and the reverse operation will take place, the rudder 11 being depressed to automatically return the aeroplane to the desired altitude.

In the form of the invention shown in Fig. 2, a modified form of pressure responsive control is employed, wherein the circuits 32 and 35 are selectively operated by an aneroid barometer in place of a mercurial barometer. In this instance the conductor 37 of the circuit 35 joins a fixed terminal 61 while the conductor 34 of the circuit 32 joins a fixed terminal 62 arranged in spaced relation to the terminal 61. These terminals 61 and 62 are carried, in the present instance, by a fixed frame 63 and are so arranged with respect to a movable contact 64 as to be respectively engaged by that contact according to the direction of its movement. This contact 64 joins a conductor 65 forming the common return to the battery 38 for both of the circuits 32 and 35 and is arranged to be operated by a lever arm 66 which is suitably pivoted at 67 to a part of the frame 63.

For oscillating the arm 66 to close either of the circuits 32 or 35 it is operatively connected at one end to a movable part of the aneroid barometer as will now be explained. This barometer consists of a casing 70 having opposed flexible diaphragms 71 and 72 forming side bounding walls for the enclosed air chamber 73, so that variations in the external air pressure are reflected in a change of position of the diaphragm 71 and to which the lever arm 66 is joined by a rod 74 and by which motion is transmitted to the arm 66. The casing 70 is mounted upon the fixed frame 63 in order to maintain the parts in operative relation.

For varying the pressure of the contained air in the chamber 73, the diaphragm 72 bears against an outwardly projecting stem 75 which has threaded engagement with the frame 63 for purposes of adjustment and is provided with a thumb-nut 76 by which the stem 75 may be moved with respect to the frame 63 in one direction or the other. This nut 73 is suitably graduated with respect to an altitude scale 77 which is located in suitable proximity thereto. In this form of the system of control the thumb-nut 76 is adjusted with respect to the scale 77 in order to set the apparatus for a predetermined altitude and in consequence the air or other suitable pressure medium within the casing 70 is placed under a pressure calculated to balance the external pressure at the predetermined or set altitude. Thus as long as the aeroplane moves in a plane at the given altitude the diaphragm 71 remains neutral and both circuits 32 and 35 are open and the solenoids 26 and 27 are de-energized.

In case the aeroplane should go below the set altitude the increased exterior air pressure will force the diaphragm 71 inwardly against the contained pressure and thereby cause the lever arm 66 to turn in a counter-clockwise direction, thus bringing the movable contact 64 into contact with the terminal 62. This results in the circuit 32 being closed so that the solenoid 26 is energized and the rudder control mechanism operates to elevate the rudder 11 and thus automatically bring the aeroplane back to the given altitude.

In case the aeroplane should rise above the set altitude, the reverse of the foregoing takes place, since the diaphragm 71 is then forced outwardly by the now predominating pressure in the chamber 73 and in consequence the lever arm 66 is turned in a clockwise direction. The contact 64 therefore closes with the terminal 61 and completes the circuit 35, so that the solenoid 27 is energized and the rudder control actuated to depress the rudder 11 to return the plane to the given altitude.

For the purpose of varying the altitude of the aeroplane at will from a distance, one form of mechanism is shown in Fig. 3, as applied to the control described in connection with Fig. 2, wherein the stem 75 is provided with an extension 80 forming a continuation thereof upon which two ratchets 81 and 82 are fixedly mounted and arranged to turn the extension 80 in opposite directions.

In order to cause the stem 75 and extension 80 to turn in a counter-clockwise direction a pawl 83 is pivotally mounted upon an arm 84, which is loosely journalled upon the stem 80 and extends radially therefrom into the path of movement of a trip finger 85. A spring 86 normally holds the arm 84 at one end of its stroke, while a spring 87 normally holds the pawl 83 out of engagement with its ratchet 81. Furthermore the pawl 83 has a lug 88 integral therewith and also extending into the path of the trip finger 85 but in such a position that the latter in its movement first picks up the lug 88 to drop the pawl 83 into engagement with the ratchet 81 and then picks up the arm 84 to cause the pawl to turn the ratchet 81 as required. The construction of the parts of the ratchet 82 are the same as for the ratchet 81, consisting of a pawl 90, spring 91, a lug 92 and a loose arm 93 journalled on the stem 80 and having a spring 94 for holding it retracted, the arrangement being such that the lug 92 and arm 93 are in the path of movement of a trip finger 95 and when engaged thereby cause the ratchet 82 to turn in a clockwise direction.

For operating the trip fingers 85 and 95, they are, in the preferred form, arranged as a part of a yoke 100 and one extends back of the pawl 83, while the other extends back of the pawl 90. A piston rod 101 is secured to the yoke 100 and passes within a cylinder 102, being first journalled in a suitable support bearing 103. Within the cylinder 102 the rod 101 terminates in a piston 104, which is normally held in a middle or neutral position by two oppositely disposed springs 105 and 106 and in such position both the trip fingers 85 and 95 are out of engagement with their respective pawls 83 and 90. Hence the plane is flying at a set altitude.

For shifting the position of the yoke 100, the opposite ends of the cylinder 102 are connected respectively by pipes 110 and 111 to a multiple port control valve 112, which connects one or the other of said pipes 110 and 111 with a pipe 113 into which pressure fluid is introduced when a reciprocal valve 114 is in the proper position to establish communication between the pipe 113 and the motive fluid reservoir 115. The operation of the reciprocal valve 114, through a suitable rack and pinion means 116, also causes the rotary valve 112 to be positioned to supply pressure fluid to the desired end of the cylinder 102. This multiple port rotary valve 112 and its cooperating adjuncts are fully described in my copending application Ser. No. 67,947, and a detailed description thereof is deemed unnecessary here.

For operating the valve 114, the movable element thereof has a stem 117 forming the core of a solenoid 120 which is arranged to be energized by the closing of a circuit 121, including a battery 122, a terminal 123 and an armature switch 124, this latter being normally held by a spring 125 to break the circuit 121. A stationary electro-magnet 126 is located in operative relation to the armature 124 and is arranged to be energized by a closed oscillatory circuit including a conductor 130, a detector 131, condensers 132, and an inductance coil 133, which is inductively connected to an inductance coil 134 which forms part of an open aerial circuit 135 arranged to respond to radiant energy.

By this construction, when an impulse or signal of radiant energy is received by the aerial circuit 135, the electro-magnet 126 will be energized thus closing the circuit through the solenoid 120 and drawing its core 117 into the solenoid, thus moving the controlling portion of the valve 114 to close the exhaust ports and admitting pressure fluid so that the ratchet mechanism 116 will rotate the valve 112 to a position to admit pressure fluid to the cylinder 102 at the end desired for the required operation. This action takes place, preferably, through the sending of a long impulse, thus allowing the rotary valve to be correctly positioned by prior short impulses, if necessary.

Assuming the course of the aeroplane is to be changed to fly at a lower altitude, then the pipe 111 will be placed in communication with the source of pressure and the piston 104 moved to the right, as seen in Fig. 3. This movement draws the yoke 100 in the same direction and brings the trip finger 95 into engagement, first with the lug 92 of the pawl 90, and then with the arm 93, so that the action is to shift the pawl 90 into engagement with its ratchet 82 and then cause the ratchet 82 to be turned by the swinging movement of the arm 93 in a clockwise direction. The threaded stem 75 is thereby turned clockwise and increases the pressure in the chamber 73, so that the diaphragm 71 is forced outwardly to cause the arm 66 to swing its contact 64 into engagement with the terminal 61 and close the circuit 35 of the solenoid 27. The rudder actuating means is then automatically operated to swing the rudder 11 in a clockwise direction to cause the aeroplane to leave the set altitude and glide downward until the increased atmospheric pressure balances the new pressure in the chamber 73, when contact 64 breaks the circuit 35 and the plane then resumes a horizontal course at the new altitude.

It will now be apparent that a complete unitary control system for aircraft has been devised whereby the aircraft is automatically maintained at a predetermined altitude, the said system operating promptly upon either a sudden change of altitude, such as a quick diving or rising action, or a gradual change of altitude, such as a relatively slow sinking below the given height. Thus the pressure responsive means operates under normal conditions of variation and this is supplemented by the gravity control for abnormal conditions. Furthermore the present system is so arranged as to be responsive to signals transmitted from a distance, whereby the altitude control device may be adjusted at will to cause the aircraft to rise or descend as desired, or to establish itself automatically at a different horizontal plane.

While in the present description the control mechanism is operated by motive fluid under pressure, it is obvious that a vacuum system may be equally well used to carry out the desired end thereby eliminating defective operation caused by pressure leaks. It is also to be understood that the present disclosure is only by way of example and that various changes may be made in the construction without departing from the scope of the invention, which is not limited to the exact details here shown.

Having now described my invention what I claim and desire to protect by Letters Patent is:—

1. A system for controlling an aircraft comprising in combination, a rudder, means responsive to variations of atmospheric pressure for controlling said rudder, and means arranged to be controlled from a distance for controlling said pressure responsive means, whereby the altitude of said aircraft can be varied at will.

2. A system for controlling an aircraft comprising in combination, a rudder, means responsive to variations of atmospheric pressure for controlling said rudder, gravity controlled means for operating said rudder, and means arranged to be controlled from a distance for controlling said pressure responsive means, whereby the altitude of said aircraft can be varied at will.

3. A system for controlling an aircraft comprising in combination, a rudder, means responsive to variations of atmospheric pressure for controlling said rudder, and means responsive to signals of radiant energy for controlling said pressure responsive means, whereby the altitude of said aircraft can be varied at will from a distance.

4. A system for controlling an aircraft comprising in combination, a rudder, means responsive to variations of atmospheric pressure for controlling said rudder, gravity controlled means for also operating said rudder, and means responsive to signals of radiant energy for controlling said pressure responsive means, whereby the altitude of said aircraft can be varied at will from a distance.

5. A system for controlling an aircraft comprising in combination, a rudder, a pressure responsive device for operating said rudder, means to set said pressure device to maintain said rudder in a neutral position at a predetermined altitude, and means operable from a distance to vary the set condition of said pressure device, whereby said aircraft may be directed at will to rise above or fall below said predetermined altitude.

6. A system for controlling an air-craft comprising in combination, a rudder, a pressure responsive device for operating said rudder, means to set said pressure device to maintain said rudder in a neutral position at a predetermined altitude, gravity controlled means for also controlling said rudder, and means operable from a distance to vary the set condition of said pressure device, whereby said aircraft may be directed at will to rise above or fall below said predetermined altitude.

7. A system for controlling an aircraft comprising in combination, a rudder, a pressure responsive device for operating said rudder, means to set said pressure device to maintain said rudder in neutral position at a predetermined altitude, means including a pendulum for also controlling said rudder, and means operable from a distance to vary the set condition of said pressure device, whereby said aircraft may be directed at will from a distance to rise above or fall below said predetermined altitude.

8. A system for controlling an aircraft comprising in combination, a rudder, means responsive to atmospheric pressure for operating said rudder, means to set said pressure means to maintain said rudder in neutral position at a predetermined altitude, means including a pendulum for also controlling said rudder, and means responsive to signals of radiant energy to vary the set condition of said pressure responsive means, whereby said aircraft may be directed at will to rise above or fall below said predetermined altitude.

9. A system for controlling aircraft comprising in combination, direction controlling means, a device responsive to variations of atmospheric pressure for controlling said direction controlling means, and means arranged to be controlled from a distance for actuating said pressure responsive device to vary the altitude of said aircraft in a predetermined manner.

10. A system for controlling aircraft comprising in combination, direction controlling means, a device responsive to variations of atmospheric pressure for controlling said direction controlling means, means arranged to be controlled from a distance for actuating said pressure responsive device to vary the altitude of said aircraft in a predetermined manner, and auxiliary automatic means for operating said direction controlling means.

11. A system for controlling aircraft comprising in combination, direction controlling means, a device responsive to variations of atmospheric pressure for controlling said direction controlling means, means arranged to be controlled from a distance for actuating said pressure responsive device to vary the altitude of said aircraft in a predetermined manner, and auxiliary gravity controlled means for operating said direction controlling means.

12. A system for controlling aircraft comprising in combination, direction controlling means, a device responsive to variations of atmospheric pressure for controlling said direction controlling means, and means responsive to signals of radiant energy for actuating said pressure responsive device to vary the altitude of said aircraft in a predetermined manner.

13. The combination with a dirigible body arranged to float in a gaseous medium, of means carried by the body for steering the body vertically, means responsive to variations in pressure of the surrounding medium upon at least a portion of said body to control said steering means and means arranged to be controlled from a point remote from and independent of said body for controlling said pressure responsive means whereby the height of the body above a given datum can be varied at will.

14. The combination with a dirigible body arranged to float in a gaseous medium, of means carried by the body for steering the body vertically, means responsive to variations in pressure of the surrounding medium upon at least a portion of said body to control said steering means to maintain the body in a strata of the medium of substantially constant pressure and means arranged to be controlled from a point remote from and independent of said body for controlling said pressure responsive means whereby the height of the body above a given datum can be varied at will.

15. The combination with a dirigible body arranged to float in a gaseous medium, of means carried by the body for steering the body vertically, means responsive to variations in pressure of the surrounding medium upon at least a portion of said body to control said steering means to steer the body upwardly when it falls below a predetermined level and to steer it downwardly when it rises above a predetermined level and means arranged to be controlled from a point remote from and independent of said body for controlling said pressure responsive means whereby the height of the body above a given datum can be varied at will.

16. The combination with an aircraft, a horizontal rudder for steering said aircraft in its normally vertical plane, a barometer carried by said body and operatively connected to said rudder to control the same, and a receiving mechanism responsive to radiant energy for varying the operative pressure of the barometer.

17. The combination with an aircraft, a horizontal rudder for steering said aircraft, in its normally vertical plane, a barometer carrier by said body and operatively connected to said rudder to return the aircraft to a level having an atmospheric pressure substantially equal to the set pressure of the barometer, and electrical receiving mechanism responsive to radiant energy for varying the set pressure of the barometer.

18. The combination with an aircraft, a horizontal rudder for steering said aircraft in its normally vertical plane, a barometer carried by said body and operatively connected to said rudder and preadjusted to remain inert only when external atmospheric pressure thereon is within certain predetermined limits for controlling said rudder, and arranged to control the rudder to steer the aircraft towards the level having atmospheric pressure within the predetermined limits, and a receiving circuit including a receiving element responsive to radiant energy, a detector for the received energy, and means controlled thereby for varying the predetermined pressure range of the barometer to vary the normal altitude of the aircraft at will.

JOHN HAYS HAMMOND, Jr.